(12) United States Patent
Adler et al.

(10) Patent No.: US 8,719,799 B2
(45) Date of Patent: *May 6, 2014

(54) MEASURING COUPLING BETWEEN COVERAGE TASKS AND USE THEREOF

(75) Inventors: Yoram Simha Adler, Haifa (IL); Rachel Tzoref-Brill, Haifa (IL); Moshe Klausner, Ramat Yishay (IL); Orna Pelleg Raz, Haifa (IL); Onn Menahem Shehory, Yahud-Monosson (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 374 days.

This patent is subject to a terminal disclaimer.

(21) Appl. No.: 13/041,456

(22) Filed: Mar. 7, 2011

(65) Prior Publication Data

US 2012/0233614 A1  Sep. 13, 2012

(51) Int. Cl.
*G06F 9/44* (2006.01)
*G06F 11/00* (2006.01)

(52) U.S. Cl.
USPC ........... 717/130; 717/124; 717/127; 717/131; 714/36

(58) Field of Classification Search
None
See application file for complete search history.

(56) References Cited

U.S. PATENT DOCUMENTS

| | | | |
|---|---|---|---|
| 5,297,150 A | | 3/1994 | Clark |
| 5,724,504 A * | | 3/1998 | Aharon et al. ................. 714/33 |
| 5,761,408 A * | | 6/1998 | Kolawa et al. ............... 714/38.1 |
| 5,896,535 A * | | 4/1999 | Ronstrom ...................... 717/131 |
| 6,085,029 A * | | 7/2000 | Kolawa et al. ............. 714/38.13 |
| 6,356,858 B1 * | | 3/2002 | Malka et al. ................... 702/186 |
| 6,513,154 B1 * | | 1/2003 | Porterfield ..................... 717/101 |
| 6,779,135 B1 * | | 8/2004 | Ur et al. ..................... 714/38.13 |
| 6,851,075 B2 * | | 2/2005 | Ur et al. .......................... 714/36 |
| 6,983,446 B2 * | | 1/2006 | Charisius et al. ............. 717/113 |
| 6,993,710 B1 * | | 1/2006 | Coad et al. ..................... 715/202 |

(Continued)

OTHER PUBLICATIONS

Lionel C. Briand et al., "Using Coupling Measurement for Impact Analysis in Object-Oriented Systems", [Online], 1999,pp. 1-8, [Retrieved from Internet on Dec. 14, 2013], <http://squall.sce.carleton.ca/people/briand/pubs/isern-99-03.pdf>.*

(Continued)

*Primary Examiner* — Thuy Dao
*Assistant Examiner* — Ziaul A Chowdhury
(74) *Attorney, Agent, or Firm* — Ziv Glazberg

(57) ABSTRACT

Test coverage is enhanced by measuring various types of coupling between coverage tasks. The coupling measurements may be implicit coupling measurements, explicit coupling measurements, coding coupling measurements, performance coupling measurements, resource coupling measurements or the like. Based on the coupling measurements, different coverage tasks may be grouped together. For example, closely coupled coverage tasks may be grouped together. The groups may also be determined based on an initial distribution of groups, by combining groups having closely coupled member coverage tasks. The groups may be ordered and prioritized, such as based on the size of the groups and the number of uncovered tasks in each group. The groups may also be ordered, such as based on coupling score which aggregate the coupling measurements of the member coverage tasks.

21 Claims, 3 Drawing Sheets

(56) References Cited

U.S. PATENT DOCUMENTS

| | | | |
|---|---|---|---|
| 7,296,261 B2 * | 11/2007 | Witchel et al. | 717/136 |
| 7,617,484 B1 | 11/2009 | Fienblit et al. | |
| 7,665,072 B2 | 2/2010 | Tillman et al. | |
| 7,725,881 B2 * | 5/2010 | Bhat et al. | 717/124 |
| 8,291,384 B2 * | 10/2012 | Takahashi | 717/124 |
| 8,448,141 B2 * | 5/2013 | Blount et al. | 717/125 |
| 8,448,147 B2 * | 5/2013 | Raz et al. | 717/130 |
| 8,527,952 B2 * | 9/2013 | Zeng et al. | 717/124 |
| 8,595,676 B2 * | 11/2013 | Tzoref-Brill et al. | 716/136 |
| 2002/0023257 A1 * | 2/2002 | Charisius et al. | 717/2 |
| 2003/0093716 A1 * | 5/2003 | Farchi et al. | 714/34 |
| 2004/0249618 A1 * | 12/2004 | Fine et al. | 703/2 |
| 2005/0223361 A1 | 10/2005 | Belbute | |
| 2006/0129994 A1 | 6/2006 | Srivastava et al. | |
| 2007/0074175 A1 * | 3/2007 | Bengtsson et al. | 717/130 |
| 2007/0288910 A1 * | 12/2007 | Bhat et al. | 717/140 |
| 2008/0022262 A1 | 1/2008 | Prakash et al. | |
| 2009/0249298 A1 * | 10/2009 | Blount et al. | 717/125 |
| 2009/0281782 A1 | 11/2009 | Bitar et al. | |
| 2009/0319833 A1 | 12/2009 | Nir-Buchbinder et al. | |
| 2010/0131930 A1 * | 5/2010 | Ben-Chaim et al. | 717/127 |
| 2010/0318958 A1 * | 12/2010 | Kuester et al. | 717/104 |
| 2011/0202904 A1 * | 8/2011 | Raz et al. | 717/130 |

OTHER PUBLICATIONS

Martin Hitz et al., "Measuring Coupling and Cohesion in Object-Oriented Systems", [Online], 1995, pp. 1-10, [Retrieved from Internet on Dec. 14, 2013], <http://www.isys.uni-klu.ac.at/PDF/1995-0043-MHBM.pdf>.*

Jefferson Offutt, "Investigations of the Software Testing Coupling Effect", [Online], ACM 1992, pp. 5-20, [Retrieved from Internet on Dec. 14, 2013], <http://delivery.acm.org/10.1145/130000/125473/p5-offuttpdf>.*

Patrick Hall et al., "Software Unit Test Coverage and Adequacy", [Online], ACM 1997, pp. 366-427, [Retrieved from Internet on Dec. 14, 2013], <http://laser.cs.umass.edu/courses/cs521-621/papers/ZhuHallMay.pdf>.*

Hagai Cibulski, "TestRank: Eliminating Waste from", Tel Aviv University Advanced Software Tools Research Seminar 2010. URL: http://www.cs.tau.ac.il/~amiramy/SoftwareSeminar/TestRank.ppt.

IBM, "Using Dependency Analysis to Supplement Code Coverage for Targeted Testing", IP.com, IPCOM000152907D, May 17, 2007.

* cited by examiner

MEASURING COUPLING BETWEEN COVERAGE TASKS AND USE THEREOF

TECHNICAL FIELD

The present disclosure relates to code coverage in general, and to grouping of coupled coverage tasks, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During testing phase, developers, QA staff members, and the like test application to verify that a newly developed application operates properly. In some cases, test cases (also referred to simply as "tests") may be devised to provide stimuli to the application, and enable testing whether its operation is correct (e.g., as expected).

However, as the total number of possible stimuli is usually large, testing can only falsify the requirements (i.e., exhibit execution in which the requirements are not met), but cannot verify correctness (i.e., prove that every execution conforms to the requirements). A measurement may be used to determine whether sufficient testing of the application was performed. Coverage analysis provides one such measurement.

A coverage model defines coverage tasks. A coverage measurement may be measured by comparing the number of covered coverage tasks with the total number of coverage tasks defined by the coverage model. For example, if the coverage model defines coverage tasks for each function of the application, and a function that is invoked during execution is considered as covering the correlating coverage task, then the greater the number of different functions that are invoked during the entire testing process, the higher the coverage measurement.

Various coverage models exist. Each defines different coverage tasks. A code coverage model defines coverage tasks associated with code elements of the Software-Under-Test (SUT). Various types of code coverage models exist, such as: function coverage (a coverage task is the execution of a function), statement coverage (a coverage task is the execution of a statement), branch coverage (a coverage task is traversing a control flow edge (i.e., taking a "branch")), decision coverage (a coverage task is each control structure in the SUT (such as an if statement); each control structure should be evaluated both to true and false), condition coverage, also known as predicate coverage (a coverage task is each Boolean sub-expression used by the SUT; each Boolean expression should be evaluated both to true and false), condition/decision coverage (a combination of condition coverage and decision coverage), modified condition/decision coverage (MC/DC) (adds to the condition/decision coverage metric the requirement that each condition should affect the decision outcome independently), path coverage (a coverage task is every possible route through the code of the SUT), Exit/entry coverage (a coverage task is every possible invocation and return of each function), and the like.

After coverage is measured, review and analysis of the testing phase may be performed to improve it based on the measured coverage. One example would be to determine whether "sufficient" testing was performed. In some cases, should the coverage measurement by above a predetermined threshold, it may be concluded that "sufficient" testing was performed. Another example would be to design a test that would cover an uncovered coverage tasks. Yet another example would be to perform test selection: selection of a subset of executed tests that would induce the same coverage measurement. Test selection may enable future testing to be more efficient by reducing duplicity. Yet another example would be to group several related coverage tasks (some of which may be covered by some test suits while other may not) into sets, and perform coverage analysis of groups of tasks thus reducing the total number of items the user needs to review.

BRIEF SUMMARY OF THE INVENTION

One exemplary embodiment of the disclosed subject matter is a computer-implemented method performed by a computerized device, comprising: obtaining coverage tasks, each coverage task is associated with a code element of a Software-Under-Test (SUT), the coverage tasks are associated with an initial distribution into groups; for each groups, with respect to substantially all other groups, computing a coupling score of the group with the other groups; grouping a set of closely coupled groups based on the computed coupling scores into a single group in a new distribution into groups.

Another exemplary embodiment of the disclosed subject matter is a computerized apparatus having a processor and a memory device, comprising: a coverage task obtainer operative to obtain coverage tasks associated with a Software-Under-Test (SUT), each coverage task is associated with a code element of the SUT, the coverage tasks are associated with an initial distribution into groups; a coupling score determinator operative to compute coupling scores of a first group with respect to a second group; a coverage tasks grouper operative to group closely coupled groups, based on the computed coupling scores.

Yet another exemplary embodiment of the disclosed subject matter is a computer program product comprising: a non-transitory computer readable medium; a first program instruction for obtaining coverage tasks, each coverage task is associated with a code element of a Software-Under-Test (SUT), the coverage tasks are associated with an initial distribution into groups; a second program instruction for, with respect to substantially all other groups and for each group, computing a coupling score of the group with the other groups; a third program instruction for grouping a set of closely coupled groups based on the computed coupling scores into a single group in a new distribution into groups; wherein the first, second, and third program instructions are stored on the non-transitory computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
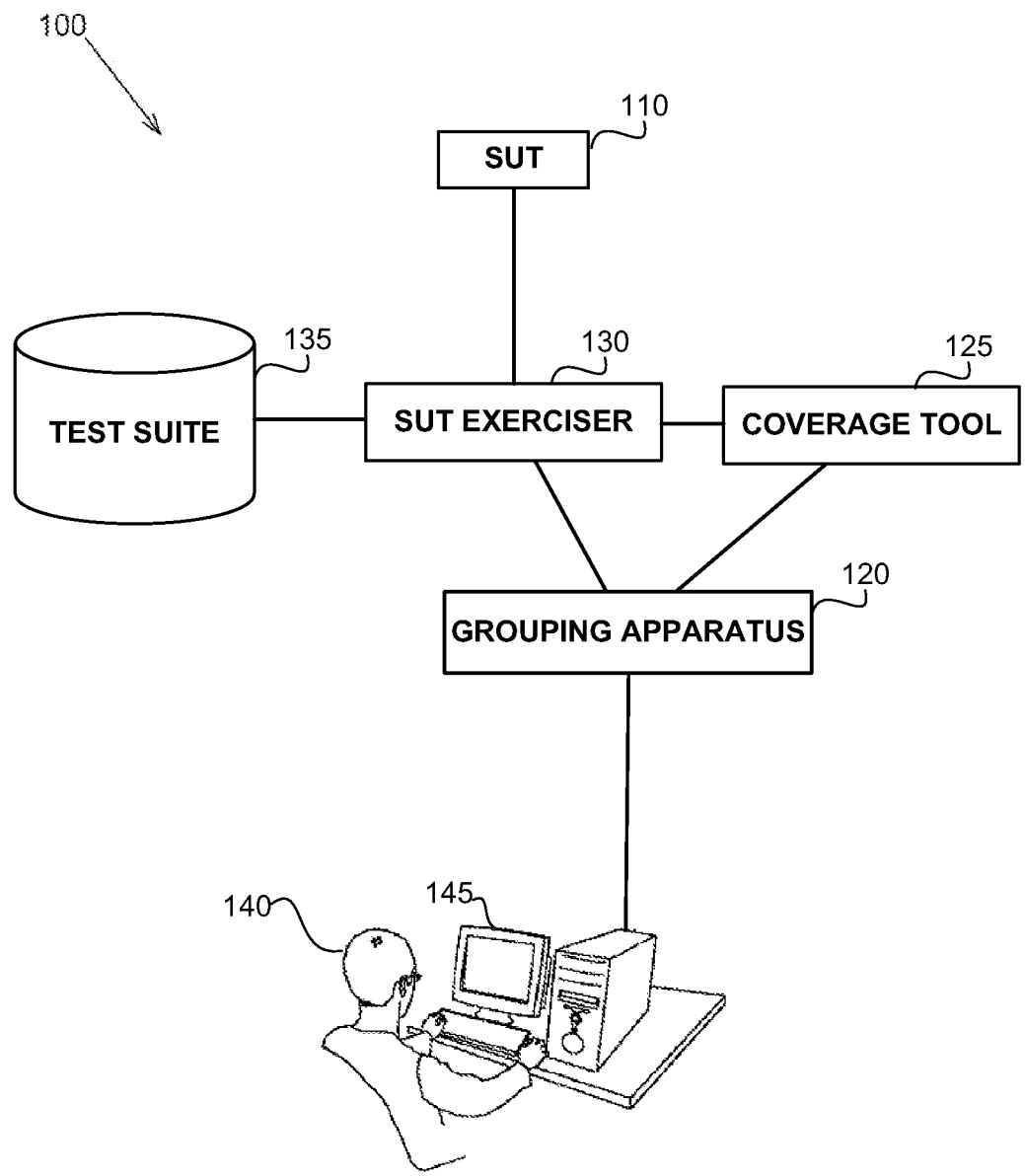
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to group coverage tasks together. Grouping may be performed so as to include closely coupled coverage tasks.

Another technical problem is to prioritize groups so as to enable a user, such as a developer, to decide to which group the user should direct his attention first. Yet another technical problem is to modify initial distribution of coverage tasks into groups by unifying two or more groups into a single group, so as to decrease the total number of groups.

One technical solution is to determine coupling measurement of a first coverage task (associated with a first code element) with respect to a second coverage task (associated with a second code element). In some exemplary embodiments, the coupling measurement may be an explicit coupling measurement, such as indicated by an invocation of the second code element by the first code element. The coupling measurement may be an implicit coupling measurement, such as a coding coupling measurement, a resource coupling measurement, a performance coupling measurement, or the like. Based on the coupling measurements, closely coupled coverage tasks may be identified and grouped together in a single group. In some exemplary embodiments, an initial distribution to groups may be modified by unifying two or more groups into a single group based on coupling measurements between member coverage tasks of the initial groups by aggregating the coupling measurements between elements in separate groups and computing coupling scores between groups. The created groups may be prioritized based on coverage score, based on the total number of coverage tasks in the group, and on the number of uncovered coverage tasks in the group. Yet another technical solution is to aggregate coupling measurements of the coverage tasks within a group to compute a coupling score of the group. The coupling score of a group may be utilized in ranking and prioritizing the groups. In some exemplary embodiments, a plurality of types of coupling measurements may be measured. In some exemplary embodiments, coupling measurements of different types may be treated separately; therefore a plurality of coupling scores of different types may be calculated, based on different types of coupling measurements. The plurality of coupling scores of different types (whether associated with groups or single tasks) may be aggregated to calculate a single coupling score. In some exemplary embodiments, the coupling score may be a weighted average of the different coupling scores, each calculated based on different coupling measurements. Based on the determined groups and the determined prioritization, a user may determine for which aspect of the SUT a test should be designed to cover uncovered tasks in one of the groups.

One technical effect of utilizing the disclosed subject matter is to group correlated coverage tasks. Yet another technical effect is to further combine groups determined by an initial group distribution. Another technical effect is to reduce the number of discrete items the user should review in a substantial manner (e.g., by an order of magnitude). Each group of closely coupled coverage tasks may be associated with an aspect of the SUT, such as the same transaction, similar functionality, or the like. Yet another technical effect is to enable prioritizing groups of coverage tasks, based on their relative importance, which is indicated by the coverage property of the coverage tasks in the groups and may also be indicated by an aggregated value of the coupling measurements of the member coverage tasks of the group.

Referring now to FIG. 1 showing a computerized environment in which the disclosed subject matter is used, in accordance with some exemplary embodiments of the subject matter.

The environment 100 may comprise a Software-Under-Test (SUT) 110 having a form of code representation. The SUT 110 may be any form of computer program, such as a non-limiting example, a software, a firmware, an application, a web application, a smartphone app, or the like.

In some exemplary embodiments, a coverage tool 125, such as implemented using software, firmware, hardware, combination thereof, or the like, may be operative to determine coverage tasks based on the SUT 110. The coverage tool 125 may utilize a code coverage model, such as function coverage, statement coverage, branch coverage, decision coverage, condition coverage, condition/decision coverage, modified condition/decision coverage (MC/DC), path coverage, exit/entry coverage, and the like. The code coverage model may define for which code elements of the SUT 110, a coverage task is created. It will be understood that a "code element" may be any element of the source code representation of the SUT 110, binary code representation of the SUT 110, or any other code representation of the SUT 110. A function may be a code element that pertains to function coverage, a statement may be a code element that pertains to statement coverage, an edge in a Control Flow Graph (CFG) may be a code element that pertains to branch coverage, and so forth.

In some exemplary embodiments, the coverage tool 125 is further operative to determine a coverage measurement based on execution of the SUT 110. The execution of the SUT 110 may be performed during the testing phase.

In some exemplary embodiments, the execution may be performed by an SUT exerciser 130. The SUT exerciser 130 may be a computerized apparatus, implemented using software, firmware, hardware, combination thereof, or the like. The SUT exerciser 130 may be configured to execute the SUT 110 using tests. The tests may be a part of a test suite 135, which may be retained in a database, storage device, storage server, Hard Drive, Flash disk, Random Access Memory (RAM), or the like. In some exemplary embodiments, the SUT exerciser 130 may apply the test suite 135 on the SUT 110 in a batch process.

In some exemplary embodiments, a grouping apparatus 120, implemented using software, firmware, hardware, combination thereof, or the like, may be configured to group coverage tasks, in accordance with the disclosed subject matter.

In some exemplary embodiments, grouping may be determined based on coupling measurements between coverage tasks. A coupling measurement of a coverage task and another coverage task may be a measurement of how much the coverage task affects or is affected by the other coverage task. In some exemplary embodiments, the coupling measurement may be formulated as a number, where the higher the number, the coupling of a first coverage task with a second coverage task is greater. Closely coupled coverage tasks may be grouped together. For example, coverage tasks that are each having a coverage measurement above a predetermined threshold coverage measurement (either a relative or an absolute threshold) may be considered closely coupled. As another example, closely coupled coverage tasks may be coverage tasks forming a clique, a strongly connected component, or a similar element in a graph, as is further disclosed hereinbelow. Additional manners to determine closely coupled coverage tasks may be obvious to a person of ordinary skill in the art reading the current disclosure.

In some exemplary embodiments, the coupling measurement is an asymmetric property, where a first coverage task may be considered closely coupled to as second coverage task, but the second coverage task may not be considered as closely coupled to the first coverage task thus given different coupling measurements.

In some exemplary embodiments, the grouping apparatus 120 may modify an initial sets of groups, such as determined by substring hole-analysis. The new distribution of coverage tasks into groups may be based on the initial sets of groups. In some exemplary embodiments, groups of the initial sets of groups may be combined into a single group in the new distribution, based on a determination that the groups are closely coupled to one another. Coupling of the groups may be determined based on the coupling measurement between the member coverage tasks of the groups. For example, when determining coupling between two groups: A and B, a coupling measurement of every pair (a,b), where a is a member of group A and b is a member of group B, may be utilized. In some exemplary embodiments, the coupling measurements may be aggregated into a coupling score of group A to group B. In some exemplary embodiments, the coupling score may be symmetric and may further take into account the pairs (b,a) as well.

In some exemplary embodiments, the grouping apparatus 120 may determine coupling scores to each of the groups. A coupling score may be an aggregation of the coupling measurements of member coverage tasks within the group into a single score. Aggregation may be achieved by calculating an average of the coupling measurements, by summing the coupling measurements, or the like. In some exemplary embodiments, the coupling scores may be normalized. For example, the coupling scores may be normalized to correlate to a standard deviation from the average. Other formulations of the coupling scores may be possible to a person of ordinary skill in the art.

In some exemplary embodiments, the coupling score between groups and of the groups may be calculated based on different types of specific coupling measurements, as are disclosed hereinbelow. A plurality of coupling scores associated with each type of coupling measurement may be calculated. The plurality of type-associated coupling scores of a coverage task may be aggregated into a coupling score of the coverage task. The coupling score may be a weighted average of the different types coupling measurements, a summation of the different types of coupling measurements (with or without using predetermined weights to each different type of coupling), or the like.

In some exemplary embodiments, the groups may be ranked. In some exemplary embodiments, the ranking may be performed based on a score that is calculated based on size of the group and the number of uncovered coverage task in the group. In some exemplary embodiments such a score may be calculated based on the ratio between uncovered coverage and the total number of member coverage tasks of the group. In such a case, a group where 90% of its member coverage tasks are not covered may be given a higher ranking that a group where 10% of its member coverage tasks are uncovered. In some exemplary embodiments, the size of the group may also be taken into account when the ranking is determined For example, a group comprising ten coverage tasks, one of which is uncovered may be given a lower ranking than a group comprising one hundred coverage tasks, ten of which are uncovered.

In some exemplary embodiments, the ranking may be based upon the coupling scores of the groups. The ranking may be utilized in prioritizing the groups, such as when determining whether sufficient coverage was reached, when determining which aspects of the SUT were not adequately covered and should be covered by a newly designed test (either manually designed, automatically generated, a combination thereof, or the like), when determining to which group of coverage tasks the developer's attention should be focused first, or the like.

In some exemplary embodiments, the grouping apparatus 120 may process groups that may include uncovered coverage tasks that are not covered by a test suite, so as to enable identification of aspects of the SUT that were not adequately covered by the test suite.

In some exemplary embodiments, a user 140, such as a developer, a QA staff member, a tester, a designer, or the like, may interact with the computerized environment 100. For simplicity, the user 140 may be generally referred to as the developer. The user 140 may utilize a Man-Machine Interface (MMI) 145 such as a terminal, a display, a keyboard, an input device or the like. The user 140 may design, develop, test, or the like, the SUT 110. The user 140 may design, update, maintain, or the like, the test suite 135. The user 140 may invoke the SUT exerciser 130, provide it with commands, rules, parameters, preferences, or the like. The user 140 may interact with the coverage tool 125 to view coverage information, provide commands, rules, parameters, preferences, or the like with respect to coverage analysis. The user 140 may view coverage information that took into account the ranking of the grouping apparatus 120. The user 140 may provide the grouping apparatus 120 with commands, rules, parameters, preferences, or the like. Based upon coverage information, the user 140 may determine to design a new test, to modify the SUT 110, fix a bug, update the test suite 135, or the like.

Figure 2:
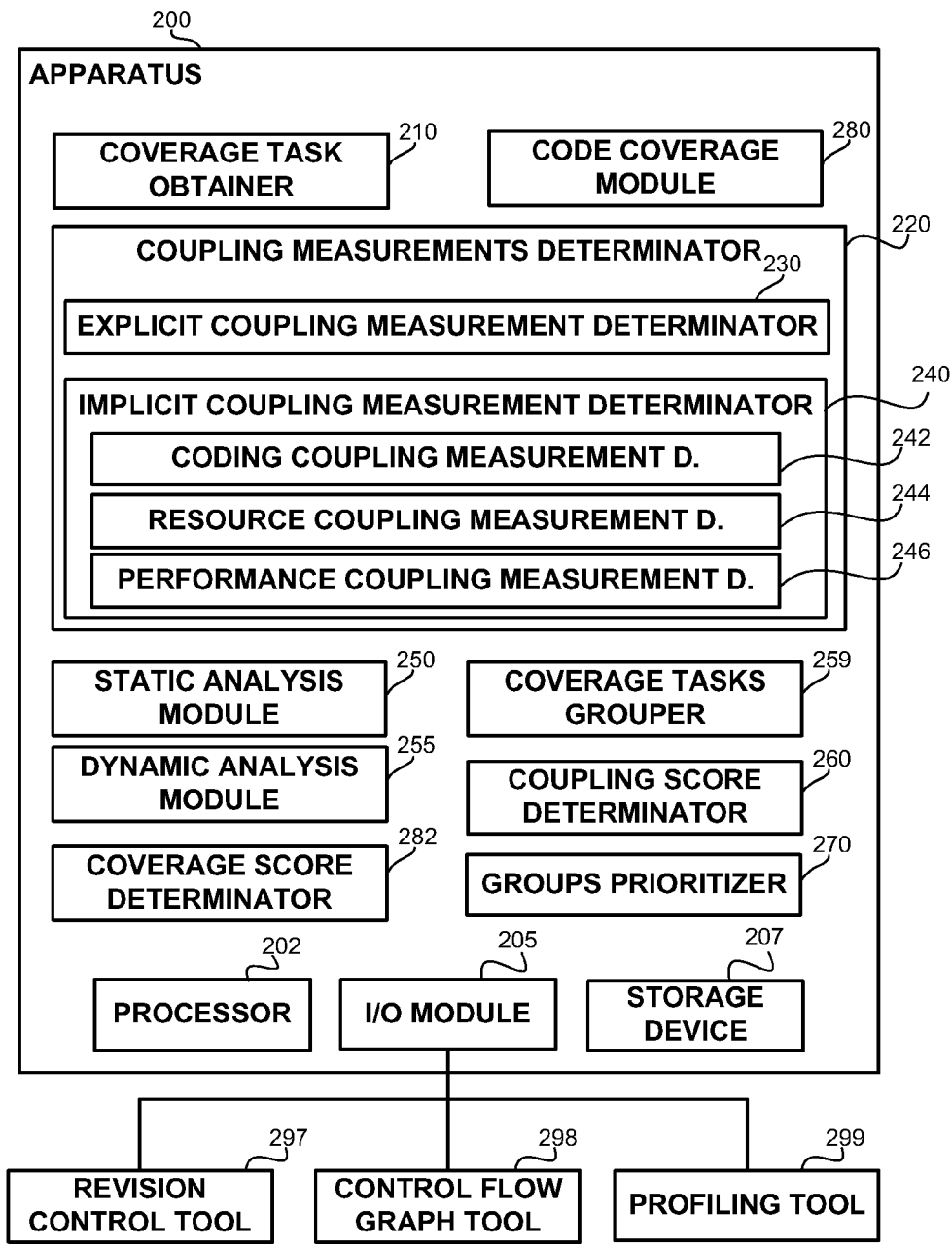
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 120 of FIG. 1, may be configured to group coverage tasks, in accordance with the disclosed subject matter.

In some exemplary embodiments, a coverage task obtainer 210 may be configured to obtain coverage tasks associated with the SUT. The coverage tasks may be obtained from a coverage tool, such as 125 of FIG. 1. The coverage tasks may be obtained from a code coverage module 280. In some exemplary embodiments, the code coverage module 280 may be configured to provide only uncovered tasks.

In some exemplary embodiments, a coupling measurements determinator 220 may be operative to measure coupling measurements. In some exemplary embodiments, a coupling measurement is measured between a first coverage task and a second coverage task. In some exemplary embodiments, the coupling measurement may be asymmetric, such that the coverage measurement of the first coverage task with respect to the second coverage task may be different than the coverage measurement of the second coverage task with respect to the first coverage task.

In some exemplary embodiments, coupling measurements of different types may be measured. A coupling measurement may be an explicit coupling measurement, an implicit coupling measurement, an aggregation thereof, or the like.

In some exemplary embodiments, an explicit coupling measurement determinator 230 may be operative to measure an explicit coupling measurement. Explicit coupling measurement may be affected by explicit interactions between a first and a second coverage tasks. For example, in case the coverage tasks correspond to functions of the SUT, an exemplary explicit coupling measurement may be indicative of the first function calling or being called by the second function. In some exemplary embodiments, the explicit coupling measurement may be asymmetric, may be determined dynamically, statically, or the like, may be relative, absolute, or the like, may be formulated by a number, normalized, or the like. In some exemplary embodiments, the coupling may be relative, so that in case the first function calls a thousand functions, one of which is the second function, the explicit coupling measurement is lower than in the case that only ten other functions are called. In some exemplary embodiments, a different weight may be given to being invoked than to invoking, such as invoking other functions may be considered as a more/less substantial evidence to explicit coupling between the coverage tasks. In some exemplary embodiments, a probability of invoking the function may be used, such as a static probability (e.g., out of the ten possible invocations of functions, two are of the second function; as another example: the probability of performing each function invocation may be estimated using static analysis measures), dynamic probability (e.g., out of ten execution of the first function, the second function was invoked a total of eight times and/or the second function was invoked in seven of those times (e.g., in one operation of the first function, the second function was invoked twice)), or the like. It will be noted that explicit coupling is not limited to function coverage, and may be applied on other coding coverage models. Invocations may be determined based on files, statements, basic blocks, functions, or the like. Invocations may be determined using a Control Flow Graph (CFG) tool 298, as is known in the art.

In some exemplary embodiments, an implicit coupling measurement determinator 240 may be operative to measure an implicit coupling measurement. An implicit coupling measurement may be indicative of a coupling between the coverage tasks which is not explicit in the code elements. As is explained hereinbelow, some exemplary implicit coupling measurements may be coding coupling, resource coupling, performance coupling, and the like. In some exemplary embodiments, the implicit coupling measurement may be asymmetric, may be determined dynamically, statically, or the like, may be relative, absolute, or the like, may be formulated by a number. In some exemplary embodiments, the implicit coupling measurement may be an aggregated value, such as a weighted average or summation, of several implicit coupling measurements of different types.

In some exemplary embodiments, a coding coupling measurement determinator 242 may be operative to measure coding coupling measurement of the first coverage tasks with respect to the second coverage task. In some exemplary embodiments, coding coupling measurement is an indication, based on operations on the source code or any other representation of the SUT, that two coding elements are associated. In some exemplary embodiments, a revision control tool 297, as is known in the art, may be operative to monitor revisions made to source code of the SUT. Based upon revisions, certain inferences may be made as to the couplings of coding elements. For example, in case that there is a strong correlation between updating a first code element and of updating a second code element, then the coding coupling measurement may be relatively high. In some exemplary embodiments, the coding coupling measurement may be asymmetric in the sense that there is a strong correlation between updating the first code element and updating the second code element, but there may be a weak correlation between updating the second code element and updating the first code element. In some exemplary embodiments, the coding coupling measurement may be measured by determining a portion of modifications made to the first code element that are associated with a modification made to the second code element out of the total modifications made to the first code element. For simplicity, two different associated modifications made to the first and second code elements may be referred to as modifications made to both the first and second code elements. In some exemplary embodiments, associated modifications may be modifications made in within predetermined timeframe, optionally by the same developer; made contemporaneously; made with respect to the same update, bug, feature or the like; or the like. In some exemplary embodiments, a revision control tool 297 may provide an Application Programming Interface (API) enabling the apparatus 200 to obtain pertinent data associated with coding coupling.

In some exemplary embodiments, a resource coupling measurement determinator 244 may be operative to measure resource coupling measurements. Resource coupling measurements may be determined based on usage of a shared resource, such as for example, a global variable, a shared memory address, a cache line, a semaphore, or the like. In some exemplary embodiments, the resource coupling may be relative (e.g., out of the total usages of resources/shared resources), absolute (e.g., a number of shared usages), or the like. The resource coupling may be statically estimated, dynamically determined, or the like. In some exemplary embodiments, resource coupling may be applied to SUTs exhibiting concurrent features, such as having a plurality of threads. In case of concurrent SUTs, resource coupling may be measured with respect to substantially concurrent usage of the shared resource.

In some exemplary embodiments, a performance coupling measurement determinator 246 may be operative to measure performance coupling measurements. Performance coupling measurement may be indicative of the first code element having an effect on a performance property associated with execution of the second code element. The effect may be in on a performance aspect, such as exhibited by performance metrics, for example, CPU utilization, memory usage, throughput, wait time, execution time, or the like. In some exemplary embodiments, the performance coupling may be determined using dynamic analysis, static analysis, or the like. In some exemplary embodiments, performance coupling measurements may be indicative of correlations (either positive or negative) between covering the first coverage task and of a performance metric while covering the second coverage task. In some exemplary embodiments, the correlation may be measured by comparing performance in executions covering the second coverage task in which the first coverage task is not covered and executions covering the second coverage task in which the first coverage task is covered. In some exemplary embodiments, performance coupling may be used with respect to concurrent SUTs. Effects on performance may be measured in cases in which a first concurrent entity (e.g., thread, process, or the like) covers the first coverage task and a second concurrent entity covers the second coverage task. Performance may be considered effected in predetermined timeframes in which both coverage tasks are covered by the two different concurrent entities. In some exemplary embodiments, performance may be measured using a profiling tool 299, as is known in the art.

In some exemplary embodiments, an analysis module such as a static analysis module 250 and/or a dynamic analysis module 255 may be useful for analyzing operation of the SUT to determine information pertinent to the coupling measurement determinator 230. In some exemplary embodiments, a static analysis module 250 may be operative to determine aspects of the behavior of the SUT without executing the SUT. The analysis may be performed based on SUT representation such as the source code, binary code or the like, such as building a CFG, identifying shared resources, identifying declared critical sections, or the like. In some exemplary embodiments, the dynamic analysis module 255 may be operative to determine aspects of the behavior of the SUT based on executions of the SUT. The dynamic analysis module 255 may monitor executions on-the-fly, review traces of previous execution, or the like. In some exemplary embodiments, the dynamic analysis module 255 may instrument the SUT's source code, binary, or similar representation with instructions useful for logging and/or monitoring operation of the SUT during execution thereof.

In some exemplary embodiments, a coverage tasks grouper 259 may be configured to group coverage tasks into groups. The grouping may be performed based on the coupling measurements. In some exemplary embodiments, a determination of closely coupled coverage tasks may be determined based on the coupling measurements. In some exemplary embodiments, the group may comprise coverage tasks that are closely coupled to each other (i.e., all member coverage tasks are closely coupled). In some exemplary embodiments, the group may comprise coverage tasks that are closely coupled to one another either directly or indirectly (i.e., two member coverage tasks may not be closely coupled to one another but indirectly closely coupled via an intermediate coverage task that is closely coupled to both).

In some exemplary embodiments, a coverage task may be a member of more than a single group. Once a coverage task is added to a group by the coverage tasks grouper 259, the coverage task may be selected to be a member of another group.

In some exemplary embodiments, a coverage task may be a member of exactly one group. Once a coverage task is added to a group by the coverage tasks grouper 259, the coverage task may be excluded from being selected as a member of another group.

In some exemplary embodiments, the coverage task grouper 259 may utilize machine learning techniques for determining closely-coupled coverage tasks, such as for example, clustering analysis, Support Vector Machines (SVM), or the like.

In some exemplary embodiments, a graph representation of the coverage task may be generated. In some exemplary embodiments, a vertex of the graph may represent a coverage task and an edge between two coverage tasks may indicate coupling. In some exemplary embodiments, the edges may be weighted with the coupling score between the coverage tasks. In some exemplary embodiments, the weight may be a score computed based on coupling measurements of different types. In some exemplary embodiments, the edges may be directed, so as to facilitate a showing of asymmetric coupling measurements between the coverage task A to coverage task B and between the coverage task B to the coverage task A. In some exemplary embodiments, the graph may consist only of edges (A,B), where the coupling measurement between A and B are above a predetermined threshold (e.g. absolute threshold or relative threshold). In some exemplary embodiments, the edge may exist in the case the coupling measurement is high with respect to all types of coupling measurements, at least one type of coupling measurement, or the like. In some exemplary embodiments, based on the graph, the groups may be determined, such as for example by identifying elements of the graph. In some exemplary embodiments, a clique may be identified and determined as a group. In some exemplary embodiments, Strongly Connected Components (SCCs) may be identified and determined as groups.

In some exemplary embodiments, an initial distribution of the coverage tasks into groups may be taken into account. In some exemplary embodiments, the initial distribution to groups may be determined by another technique, such as for example substring hole analysis. Groups of the initial distribution may be combined together into larger groups based on coupling measurements of the member coverage tasks. For example, two groups determined using substring hole analysis may be merged into a single group based on a determination that a substantial portion, such as fifty percent, of the first group is closely coupled to a substantial portion, such as thirty percent, of the second group. Other methods of aggregating the coupling measurements so as to indicate coupling of groups may be applied. By reducing the number of groups, an effort required by the developer to review all the groups may be reduces accordingly. In some exemplary embodiments, merging of groups may be performed based on a coupling score determined by a coupling score determinator 260, as is disclosed hereinbelow.

In some exemplary embodiments, the a graph having nodes representing groups of the initial distribution may be created. An edges between two nodes in the graph may be weighted with an aggregated coupling measurements between member coverage tasks of the two groups associated with the two nodes. Elements of the graph, such as SCCs may be identified and based thereof groups may be merged.

It will be noted that in substring hole analysis technique, a label associated with a coverage task is assumed to be indicative of its functionality. The label may be, for example, the name of function that the coverage task is associated with. As opposed to grouping performed by disclosed subject matter, in substring hole analysis the grouping is determined based upon having a shared substring in the label, and not based upon coupling measurements and identification of closely coupled coverage tasks. Substring hole analysis is disclosed in Yoram Adler, Eitan Farchi, Moshe Klausner, Dan Peleg, Orna Raz, Moran Shochat, Shmuel Ur and Aviad Zlotnick, "Automated Substring Hole Analysis", ICSE 2009, Yoram Adler, Eitan Farchi, Moshe Klausner, Dan Pelleg, Orna Raz, Moran Shochat, Shmuel Ur and Aviad Zlotnick, "Advanced Code Coverage Analysis Using Substring Holes", ISSTA 2009, which are both hereby incorporated by reference.

In some exemplary embodiments, a coupling score determinator 260 may be configured to aggregate the coupling measurements of member coverage tasks of a group into a coupling score. The aggregation may be performed by computing an average of the various coupling measurements, by summing the coupling measurements, or the like. In some exemplary embodiments, intermediate coupling scores of different types may be calculated based on coupling measurements of the same type. The intermediate coupling scores may be used to compute the coupling scores, such as by computing an average, a weighted average, a summation, or a similar computation. In some exemplary embodiments, the coupling score may be normalized. In some exemplary embodiments, the coupling score may be determined based on coupling measurements between member coverage tasks only. In some alternative exemplary embodiments, the coupling score may be determined based on all coupling measurements associated with member coverage tasks.

In some exemplary embodiments, the coupling score determinator 260 may be configured to determine a coupling score of a single task. In some exemplary embodiments, the coupling score determinator 260 may be configured to determine a coupling score of a group based on coupling measurements of the tasks within the group. In some exemplary embodiments, the coupling score determinator 260 may be configured to determine a coupling score between groups based on the coupling measurements of a pair of tasks (a,b) from the groups.

In some exemplary embodiments, a groups prioritizer 270 uses the coverage score of the group which may be calculated by a coverage score determinator 282 based on the coverage information obtained from coverage module 280. The groups prioritizer 270 may be configured also to create secondary prioritization based on the calculated coupling scores as well. In some exemplary embodiments, groups of coverage tasks may be ranked and ordered so as to enable a user, such as 140 of FIG. 1, to design a test that covers at least one uncovered coverage task in one of the high-priority groups. In such a scenario, the user may select the highly-ranked group of coverage tasks and design the test in accordance with the group. In some exemplary embodiments, a test generator (not shown) may be configured to generate, either automatically, or semi-automatically, a test based on selected uncovered coverage tasks.

In some exemplary embodiments, a code coverage module 280 may provide functionality such as provided by the coverage tool 125 of FIG. 1. The code coverage module 280 may generate the coverage tasks. The code coverage module 280 may generate the coverage tasks based on a predetermined code coverage metric. The code coverage module 280 may be configured to determine which coverage tasks are covered by a test suite and which are not. The coverage module 280 may be configured to generate only the uncovered tasks. In some exemplary embodiments, the code coverage module 280 may determine coverage by monitoring execution of the SUT, by reviewing logs of execution of the SUT, or the like. In some exemplary embodiments, the code coverage module 280 may be configured to compute a coverage measurement for the test suite, such as for example based on a portion of coverage tasks that was covered in the test suite.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1. The I/O module 205 may provide for an interface to external modules, tools, devices, or the like, such as the revision control tool 297, the control flow graph tool 298, the profiling tool 299, the test suite 135 of FIG. 1, the coverage tool 125 of FIG. 1, or the like.

In some exemplary embodiments, the apparatus 200 may comprise a storage device 207. The storage device 207 may be a hard disk drive, a Flash disk, a Random Access Memory (RAM), a memory chip, or the like. In some exemplary embodiments, the storage device 207 may retain program code operative to cause the processor 202 to perform acts 1s associated with any of the subcomponents of the apparatus 200. In some exemplary embodiments, the storage device 207 may retain the values of coupling measurements, the coupling scores, the coverage measurement, the selected subset of tests, or the like.

Figure 3:
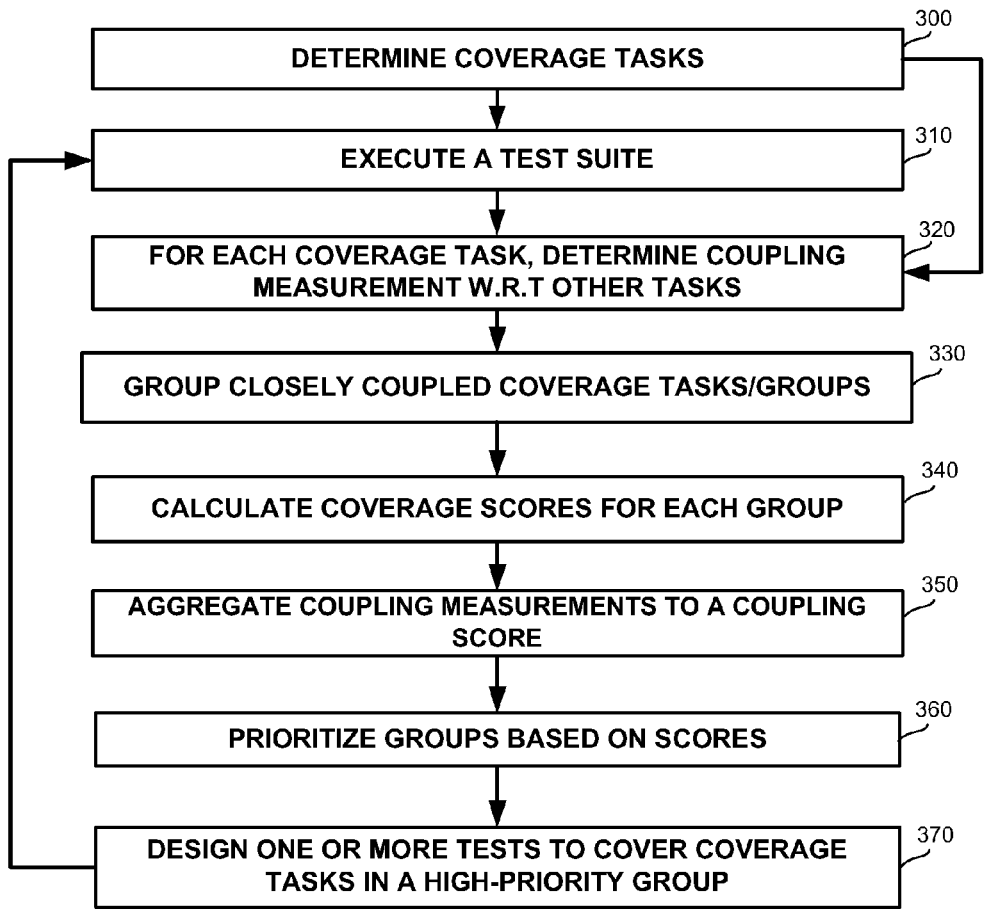
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, coverage tasks may be determined The coverage tasks may be determined by a code coverage module, such as 280 of FIG. 2, or by a coverage tool, such as 125 of FIG. 1.

In step 310, a test suite may be executed. In some exemplary embodiments, the test suite may be executed by an SUT exerciser, such as 130 of FIG. 1. In some exemplary embodiments, the test suite may be executed manually by a user, such as 140 of FIG. 1.

In step 320, for each coverage task, coupling measurement with respect to other tasks may be determined. The coupling measurement may be determined by a coupling measurements determinator, such as 220 of FIG. 2. The coupling measurement may be explicit coupling measurement, implicit coupling measurement, combination thereof, or the like. In some exemplary embodiments, the measurements may be determined using external tools, such as for example, a revision control tool, such as 297 of FIG. 2, a control flow graph tool, such as 298 of FIG. 2, and a profiling tool, such as 299 of FIG. 2.

It will be noted that analysis of the coverage tasks may be performed without execution of the test suite, such as by performing static analysis. Static analysis may be performed in lieu or in addition to dynamic analysis. Static analysis may be performed by a static analysis module, such as 250 of FIG.

2. In case the test suite is executed in step 310, dynamic analysis may be performed by a dynamic analysis module, such as 255 of FIG. 2.

In step 330, groups of closely coupled coverage tasks may be determined Alternatively, based on an initial distribution into groups, closely coupled groups may be merged to a single group. The determination may be based on coupling measurements between the coverage tasks/groups. In some exemplary embodiments, the grouping may be performed based on Strongly Coupled Components in a graph representation of the relationships between coverage tasks/groups, based on a clique in the graph, based on a similar element in the graph, based on a graph which takes into account all or some of the coupling measurements, or the like. In some exemplary embodiments, grouping may be performed by a coverage tasks grouper, such as 259 of FIG. 2.

In step 340, for each group, coverage score may be determined The coverage score may be determined by a coverage score determinator, such as 282 of FIG. 2.

In step 350, for each group, the coupling measurements may be aggregated into a coupling score between single tasks or between groups of tasks or for single group. In some exemplary embodiments, intermediate coupling scores with respect to different types of coupling measurements may be calculated and utilized in computing the coupling score of the group. The coupling score may be calculated by a coupling score determinator, such as 260 of FIG. 2.

In step 360, groups are prioritized based on the coverage attributes of the groups. For example, a score f(g) may be computed for each group g, where the score depends on the number of coverage tasks in g (i.e., |g|) and the number of uncovered coverage tasks in g (i.e., |u(g)|, where u(g) is the set of uncovered coverage tasks in g). Step 360 may further prioritize groups based on coupling scores. Prioritization may be performed by a groups prioritizer, such as 270 of FIG. 2.

The groups may be outputted to a developer to be viewed. In some exemplary embodiments, the groups may be outputted in a sorted manner, wherein the order is based on the prioritization.

In step 370, a test may be designed, generated, created or the like. The test may be directed towards covering at least one coverage task in a group having a relatively high determined priority. The test may be designed either manually by a developer, automatically by a test generator, or in a combination thereof. In some exemplary embodiments, the new test may be added to the test suite which may be executed again in step 310.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
    obtaining coverage tasks, each coverage task associated with a code element of a Software-Under-Test (SUT), wherein the coverage tasks are associated with an initial distribution into at least two groups;
    for each group, computing coupling scores between the group and each of all other groups;
    grouping a set of closely coupled groups based on the computed coupling scores into a single group in a new distribution into groups, wherein the coupling score is calculated based on one or more coupling measurements selected from the group consisting of an explicit coupling measurements and an implicit coupling measurements, wherein the explicit coupling measurement of a first coverage task and a second coverage task is indicative of an interaction between a first code element of the first coverage task and a second code element of the second coverage task; and
    the explicit coupling measurement is a total number of invocations of the first code element by the second code element and of invocations of the second code element by the first code element, wherein an invocation of the first code element by the second code element is given a different weight than an invocation of the second code element by the first code element; and
    the implicit coupling measurement of the first coverage and the second coverage task is indicative of an implicit association between the first code element and the second code element.

2. The computer-implemented method of claim 1, wherein the initial distribution of coverage tasks into groups comprises a set of groups, each group comprising exactly one coverage task.

3. The computer-implemented method of claim 1, wherein said grouping comprises determining strongly connected components in a graph representation of the coverage tasks and their respective coupling scores.

4. The computer-implemented method of claim 1, wherein the implicit coupling measurement is a coding coupling measurement of the first code element with respect to the second code element, wherein the coding coupling measurement is measured as a relative portion of source code modifications made to both the first and second code elements in respect to all source code modifications made to the first code element.

5. The computer-implemented method of claim 1, wherein the implicit coupling measurement is a resource coupling measurement indicative of a use of a shared computer resource.

6. The computer-implemented method of claim 1, wherein the implicit coupling measurement is a performance coupling measurement indicative of the first code element having an effect on a performance property associated with execution of the second code element.

7. The computer-implemented method of claim 1, further comprising: prioritizing the groups of the new distribution into groups, based on attributes of member coverage tasks of each group.

8. The computer-implemented method of claim 7, further comprising:
    computing a coupling score to each group, wherein the coupling score is an aggregated value of the coupling measurements of coverage tasks that are members of the group; and
    wherein said prioritizing the groups is modified by the computed coupling scores.

9. The computer-implemented method of claim 8, further comprising:
    executing a test suite operable to operate the SUT; and
    prior to said grouping, filtering out covered coverage tasks; whereby said grouping provides for groups of uncovered coverage tasks.

10. The computer-implemented method of claim 8, wherein said computing the coupling score comprises computing a type-specific coupling score to each type of coupling measurements and applying a corresponding weight to each type-specific coupling score.

11. The computer-implemented method of claim 8, further comprises, manually, automatically, or in a combination thereof:
    selecting a group having a relatively high-priority; and
    designing a test in order to cover at least one uncovered coverage task that is a member of the selected group.

12. The computer-implemented method of claim 11, further comprising adding the test to the test suite and re-executing the modified test suite.

13. The computer-implemented method of claim 1, wherein said computing a coupling measurement comprises statically analyzing the code to determine the coupling measurement.

14. The computer-implemented method of claim 1, wherein said computing a coupling measurement comprises dynamically analyzing the code to determine the coupling measurement, wherein said dynamically analyzing comprises monitoring execution of tests.

15. The computer-implemented method of claim 1, further comprises outputting an indication to a user, wherein the indication provides a concise report of uncovered coverage tasks, wherein the concise report is based on the groups of the new distribution into groups.

16. A computerized apparatus having a processor and a memory device, comprising:
    a coverage task obtainer operative to obtain coverage tasks associated with a Software-Under-Test (SUT), each coverage task associated with a code element of the SUT, wherein the coverage tasks are associated with an initial distribution into at least two groups;
    a coupling score determinator operative to compute coupling scores between a first group and substantially each of all other groups;
    a coverage tasks grouper operative to group closely coupled groups, based on the computed coupling scores, wherein the coupling score is calculated based on one or more coupling measurements selected from the group consisting of an explicit coupling measurements and an implicit coupling measurements, wherein the explicit coupling measurement of a first coverage task and a second coverage task is indicative of an interaction between a first code element of the first coverage task and a second code element of the second coverage task; and the explicit coupling measurement is a total number of invocations of the first code element by the second code element and of invocations of the second code element by the first code element, wherein an invocation of the first code element by the second code element is given a different weight than an invocation of the second code element by the first code element; and the implicit coupling measurement of the first coverage and the second coverage task is indicative of an implicit association between the first code element and the second code element.

17. The computerized apparatus of claim 16 further comprising:

an explicit coupling measurement determinator operative to compute the explicit coupling measurement, wherein the explicit coupling measurement is indicative of an interaction between a first code element of a first coverage task and a second code element of a second coverage task; and an implicit coupling measurement determinator operative to compute the implicit coupling measurement, wherein the implicit coupling measurement of a the first coverage and the second coverage task is indicative of an implicit association between the first code element and the second code element; and wherein said coupling score determinator is configured to compute coupling scores based on implicit and explicit coupling measurements.

18. The computerized apparatus of claim 17, wherein said implicit coupling measurement determinator is operatively coupled to at least one of the following determinators:

a coding coupling measurement determinator operative to compute coding coupling measurement of the first coverage tasks with respect to the second coverage task, wherein the coding coupling measurement is computed as a relative portion of source code modifications made to both the first and second code elements in respect to all source code modifications made to the first code element;

a resource coupling measurement determinator operative to compute resource coupling measurements, wherein a resource coupling measurement is indicative of a use of a shared resource; and a performance coupling measurement determinator operative to compute performance coupling measurement, wherein the performance coupling measurement is indicative of the first code element having an effect on a performance property associated with execution of the second code element.

19. The computerized apparatus of claim 16, wherein said coupling score determinator is operatively coupled to a coupling measurement determinator operative to determine coupling measurements between coverage tasks, wherein the coupling measurement determinator is operatively coupled to an analysis module selected from the group consisting of a static analysis module and a dynamic analysis module, wherein said analysis module is configured to analyze operation of the SUT.

20. The computerized apparatus of claim 16, further comprising: a groups prioritizer operative to prioritize the groups determined by said coverage tasks grouper based upon coupling scores of the determined groups.

21. A computer program product comprising:

a non-transitory computer readable medium;

a first program instruction for obtaining coverage tasks, each coverage task associated with a code element of a Software-Under-Test (SUT), wherein the coverage tasks are associated with an initial distribution into at least two groups;

a second program instruction for, computing coupling scores between each group and each of all other groups;

a third program instruction for grouping a set of closely coupled groups based on the computed coupling scores into a single group in a new distribution into groups, wherein the coupling score is calculated based on one or more coupling measurements selected from the group consisting of an explicit coupling measurements and an implicit coupling measurements, wherein the explicit coupling measurement of a first coverage task and a second coverage task is indicative of an interaction between a first code element of the first coverage task and a second code element of the second coverage task; and the explicit coupling measurement is a total number of invocations of the first code element by the second code element and of invocations of the second code element by the first code element, wherein an invocation of the first code element by the second code element is given a different weight than an invocation of the second code element by the first code element; and the implicit coupling measurement of the first coverage and the second coverage task is indicative of an implicit association between the first code element and the second code element;

wherein said first, second, and third program instructions are stored on said non-transitory computer readable media.

* * * * *